US010755355B1

(12) United States Patent
Ross et al.

(10) Patent No.: US 10,755,355 B1
(45) Date of Patent: Aug. 25, 2020

(54) COLLABORATION AND DYNAMIC PLANNING SYSTEMS AND METHODS

(71) Applicant: MASSACHUSETTS MUTUAL LIFE INSURANCE COMPANY, Springfield, MA (US)

(72) Inventors: Gareth Ross, Amherst, MA (US); Tricia Walker, East Hampton, MA (US); Yaron Ben-Zvi, Hastings on Hudson, NY (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 992 days.

(21) Appl. No.: 14/976,801

(22) Filed: Dec. 21, 2015

Related U.S. Application Data

(60) Provisional application No. 62/094,728, filed on Dec. 19, 2014.

(51) Int. Cl.
*G06Q 40/06* (2012.01)
(52) U.S. Cl.
CPC .................. *G06Q 40/06* (2013.01)
(58) Field of Classification Search
None
See application file for complete search history.

(56) References Cited

U.S. PATENT DOCUMENTS

| | | | | |
|---|---|---|---|---|
| 6,064,984 A | * | 5/2000 | Ferguson | G06Q 40/00 705/35 |
| 2003/0065544 A1 | * | 4/2003 | Elzinga | G06Q 10/1093 705/7.18 |
| 2007/0027736 A1 | * | 2/2007 | Reynolds | G06Q 10/0637 705/7.36 |
| 2013/0185624 A1 | * | 7/2013 | Appleyard | G06F 16/26 715/234 |
| 2015/0118667 A1 | * | 4/2015 | Andrew | G06Q 10/103 434/236 |

FOREIGN PATENT DOCUMENTS

AU 2011363068 A1 * 11/2013 ............. G06Q 40/06

OTHER PUBLICATIONS

WebFX, "HTML5 Canvas Element Guide", 2018, WebFX, p. 1 (Year: 2018).*

* cited by examiner

*Primary Examiner* — Abhishek Vyas
*Assistant Examiner* — Dario Bianco
(74) *Attorney, Agent, or Firm* — Foley & Lardner LLP

(57) ABSTRACT

Systems and methods can present a financial plan that is based upon a customized selection of goals on a user interface, whereby a set of shapes representing goals can be configured along a timeline and data representing those goals can be edited, which dynamically adjusts a financial plan algorithm to provide a solution in a more dynamic and on demand approach than conventional solutions.

12 Claims, 13 Drawing Sheets

COLLABORATION AND DYNAMIC PLANNING SYSTEMS AND METHODS

CROSS-REFERENCE TO RELATED APPLICATIONS

This application claims priority to U.S. Provisional Patent Application Ser. No. 62/094,728, filed Dec. 19, 2014, which is hereby incorporated by reference in its entirety.

FIELD OF THE DISCLOSURE

The present disclosure relates in general to computer-based collaboration and dynamic planning systems and methods.

BACKGROUND

Social and technological trends are shaping a new generation of young adults, a demographic of people in their twenties and thirties that are bound by a set of shared beliefs and attitudes. Among the key trends that shape this demographic include blurring between physical and digital interactions, general distrust in financial institutions, fluidity with ownership, and participatory economics.

This demographic is additionally empowered by technology that enables them to search for authentic content that they can consume across various media formats as desired. This age group usually has concrete short term goals, long term goals subjected to change, plans for those goals and motivation to act upon them, and have realistic views about what they have done and what they still have to do.

This population is rapidly becoming a new force in culture and commerce and may be of particular interest for the life insurance business. However, reaching this population may be a difficult task to accomplish with traditional media. Therefore, a new way to reach people with these demographics may become a strategic advantage.

Conventional solutions do not offer a computer-based solution that allows for a user to share media with other users that have similar goals and demographics without requiring the user to select who should receive the media. Also, conventional solutions do not allow for a user to customize a profile or plan using graphical representations that can be adjusted in position on a screen, whereby the adjustment of the graphical representation can dynamically change the profile or plan. Instead, conventional solutions merely allow a user to enter values or use scroll bars to change values.

SUMMARY

A system and method for providing users with personal information and personalized advice, and enabling the users to take corresponding action(s) are disclosed. According to an embodiment, a personal financial mentoring and management system operates in a system architecture that includes different components that dynamically interact with each other through network connections. In this embodiment, the system includes one or more internal databases, one or more external databases, one or more client computing devices, one or more servers, a personal financial management system, and one or more of the following software modules: appointment modules, timeline modules, personal finance status modules, comparative financial status modules, learning modules, financial planning modules, content management system (CMS) modules, among others.

Further to this embodiment, the system also includes a suitable user interface to interact with users by means of a computing device.

According to some embodiments, a method for the operation of a personal financial management system includes a plurality of steps performed by a processor. The steps include: authenticating a user; and presenting the authenticated user a home screen in which system functionality is made available to the user. In this embodiment, the system functionality includes one or more of the following: managing appointments, scheduling and managing tasks and milestones, estimating the user's behavioral profile and financial metrics related to the user, providing comparative financial status related to the user's behavioral profile, providing learning material and scheduling classes, calculating a financial plan, and uploading and downloading content from the system, among others.

According to other embodiments, a personal financial management system estimates a user's behavioral profile by scoring answers provided by the user in response to a set of tests requested by a personal status module. The personal status module estimates the user's behavioral profile by comparing the resulting scores with a plurality of behavioral models' reference scores that the personal status module retrieves from an internal database. In still other embodiments, the personal status module uses big data analytics, for example retrieved from an internal database, to approximate the user's behavioral profile by comparing the user score with a plurality of predefined user profile scores. In yet other embodiments, the personal status module estimates a user's risk taking metrics, and investment preferences, among others, by using big data analytics on data associated with a plurality of users and a plurality of predefined risk taking metrics, and investment preferences, among others associated to a plurality of behavioral profiles.

In some embodiments, a personal financial management system calculates comparative financial statistics for a user based on the user's behavioral profile. The steps for calculating the comparative statistics for the user include: retrieving financial data associated with the user's behavioral profile from external databases; retrieving financial information, demographic information, user preferences, and the like from internal databases; calculating comparative statistics based on the retrieved data, and producing reports that are presented to the user via a client computing device.

According to other embodiments, a personal financial management system produces a user's financial plan from data retrieved by a financial planning module from internal and external databases, and presents the retrieved data to the user for further customization via a client computing device. In these embodiments, the financial planning module produces a financial plan for the user based on the user's behavioral profile. Further to these embodiments, the financial planning module produces a financial plan for the user by retrieving the user's behavioral profile from an internal database and retrieving a default financial plan associated to a behavioral profile. In yet other embodiments, a financial planning module produces a financial plan for a user by using big data analytics on a set of potential investments, insurance, and other financial options associated with a plurality of users and behavioral profiles. In these embodiments, the steps for estimating a financial plan for the user include: retrieving, from an internal database, the profile that is be associated with the user; requesting budget information from the user through the user interface of a client computing device; estimating a financial plan that closely fits the retrieved user behavioral profile; requesting the user to further customize the calculated financial plan; and presenting the customized financial plan to the user.

In one embodiment, a computer-implemented method comprises presenting, by a server, a graphical user interface containing an element having one or more geometric representations of a goal, wherein the geometric representation is associated with information stored in a data record; repositioning, by the server, the one or more geometric representations on the element of the graphical user interface; dynamically adjusting, by the server, the data record based upon a new position of the geographic representation on the element of the graphical user interface; dynamically adjusting, by the server, an algorithm based upon the information in the dynamically adjusted data record; and presenting, by the server, an output of the algorithm upon the dynamic adjustment of the algorithm.

In one aspect, the geometric representation is a rectangle. The element can be a canvas element. The method can further comprise receiving, by the server, a selection of the geometric representation; and presenting, by the server, options to edit the information associated with the geometric representation. Each geometric representation can be associated with a goal of a financial plan. The information associated with the geometric representation can comprise a priority. The method can further comprise, upon receiving a request to edit the information, dynamically adjusting, by the server, the algorithm. The element can comprise a timeline, whereby repositioning the geometric representation dynamically adjusts timeline information in the data record.

In another embodiment, a system comprises a server coupled to a database, wherein the server is configured to transmit a graphical user interface for presentation on a display of a user computing device, the graphical user interface containing an element having one or more geometric representations of a goal, wherein the geometric representation is associated with information stored in a data record in the database, wherein the server is configured to repositioning the one or more geometric representations on the element of the graphical user interface upon receiving a selection to move the geometric representation, dynamically adjust the data record based upon a new position of the geographic representation on the element of the graphical user interface, dynamically adjust an algorithm based upon the information in the dynamically adjusted data record, and present an output to the display of the user computing device of the algorithm upon the dynamic adjustment of the algorithm.

In one aspect, the geometric representation is a rectangle. The element can be a canvas element. The server can further be configured to receive a selection of the geometric representation; and present options to edit the information associated with the geometric representation. Each geometric representation can be associated with a goal of a financial plan. The information associated with the geometric representation can comprise a priority. The server can further be configured to, upon receiving a request to edit the information, dynamically adjust the algorithm. The element can comprise a timeline, whereby repositioning the geometric representation dynamically adjusts timeline information in the data record.

The disclosed system and methods may enable insurance companies to engage users to take actions toward their financial future, which may in turn increase trust in the financial institutions. Users using the disclosed system and methods may make informed decisions about their financial future and may feel compelled to purchase financial products from insurance companies.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
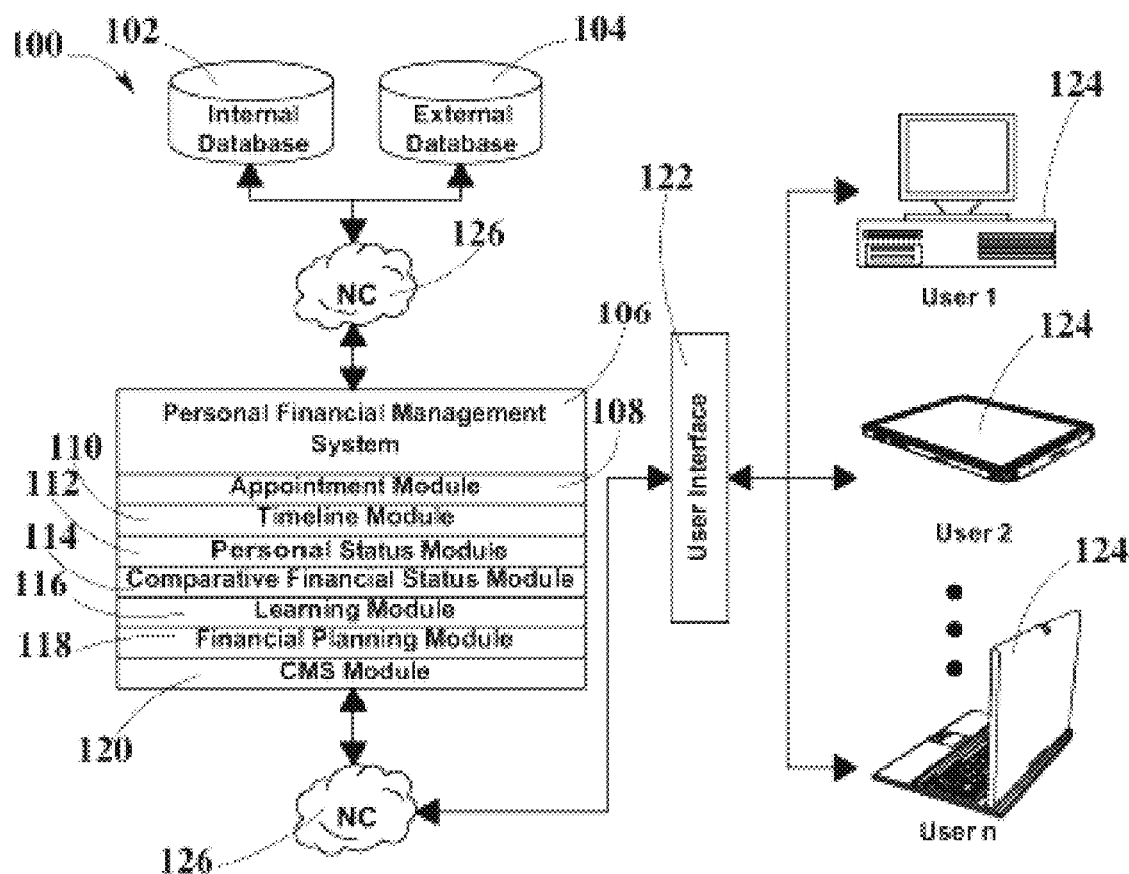
FIG. 1 is an exemplary system architecture of a personal finance mentoring and managing system, according to an embodiment.

The present disclosure herein is described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The present disclosure describes systems and methods for personal finance mentoring and management. The system may mentor users and help them manage their finances during milestones in their life.

FIG. 1 is an illustration of the system architecture 100 of a personal finance mentoring and management system, according to an embodiment. The disclosed system architecture 100 may be owned by an insurance company. System architecture 100 may include one or more internal databases 102, one or more external databases 104, a personal financial management system 106, a plurality of servers (not shown in FIG. 1) comprising the necessary hardware and software to implement the aforementioned database and management system elements, and a plurality of client computing devices 124, among other components. Examples of firmware and/or hardware and associated software enabling functionality of the aforementioned servers and plurality of client computing devices 124 are detailed in FIG. 2, below). Internal database 102 may store data generated by one or more software modules, operating within personal financial management system 106. Internal database 102 may be implemented through known in the art database management systems (DBMS), including MYSQL, POSTGRESQL, SQLITE, MICROSOFT SQL Server, MICROSOFT Access, ORACLE, SAP, DBASE, FOXPRO, IBM DB2, LIBREOFFICE Base, FILEMAKER Pro, and/or any other type of database that may organize collections of data.

Personal financial management system 106 may be operatively coupled to internal database 102 through network connections 126, and may include one or more appointment modules 108, one or more timeline modules 110, one or more personal finance status modules 112, one or more comparative financial status modules 114, one or more learning modules 116, one or more financial planning module 118, one or more content management system (CMS) module 120, and any other suitable software module required for the proper operation of personal financial management system 106. Each module within personal financial management system 106 may be a set of computer instructions executed by central processing units that run computer executable program instructions or related algorithms. Each central processing unit may be a component of computing devices such as a server, a single computer, or multiple computers in a distributed configuration.

Personal financial management system 106 may display a suitable user interface 122 on client computing device 124, so a user, such as a team leader and/or a team participant, may interact with personal financial management system 106. Client computing device 124 may be any computing device such as smartphones, desktop computers, laptop computers, tablets, PDAs, and/or another type of processor-controlled device that may receive, process, and/or transmit digital data. In some embodiments, personal financial management system 106 may display additional user interface 122 on client computing devices 124 that may correspond to tasks not specific to sub-applications described herein.

A user may interact with user interface 122 via an input device, such as a touch screen, a mouse, a keyboard, and a keypad, among others. Appointment module 108 may allow users to manage appointment schedules for various purposes including class schedules, and financial advising schedules, among others. The appointment module 108 may interact with external databases to synchronize appointment data. External databases 104 may include iCal, Google Calendar, Outlook Calendar, and Outlook.com, and the like. Timeline module 110 may convey to the user, the idea of step by step goals that may be part of a whole personal finance plan. Personal status modules 112 may provide the user with information about the user which may include traits, relevant people having the same traits, and general advice from people who share the same trait, among others. Comparative financial status module 114 may provide the user with information that may be collected across a set of users similar to the user. Similarity may be approximated based on calculated affinity, shared trait, age, income, and financial status, among others.

Information presented to the user by the comparative financial status modules 114 may include age average of similar people, typical financial goals of similar people, and dwelling of similar people, among others. Learning module 116 may provide the user with access to a virtual classroom where information about specific topics may be available. Topics may include those related to finance, health, self-improvement, and family, among others. Financial planning module 118 may provide the user with information that may serve as a guide for future financial planning, including what other people are doing with their financial life at some stage of their life, and prepare a financial investment budget based on a predefined set of questions that may be answered by the user. CMS module 120 may enable users to upload media files to the system to be shared across all users. Media may include text, photos, pictures, audio, and video, among others.

Figure 10:
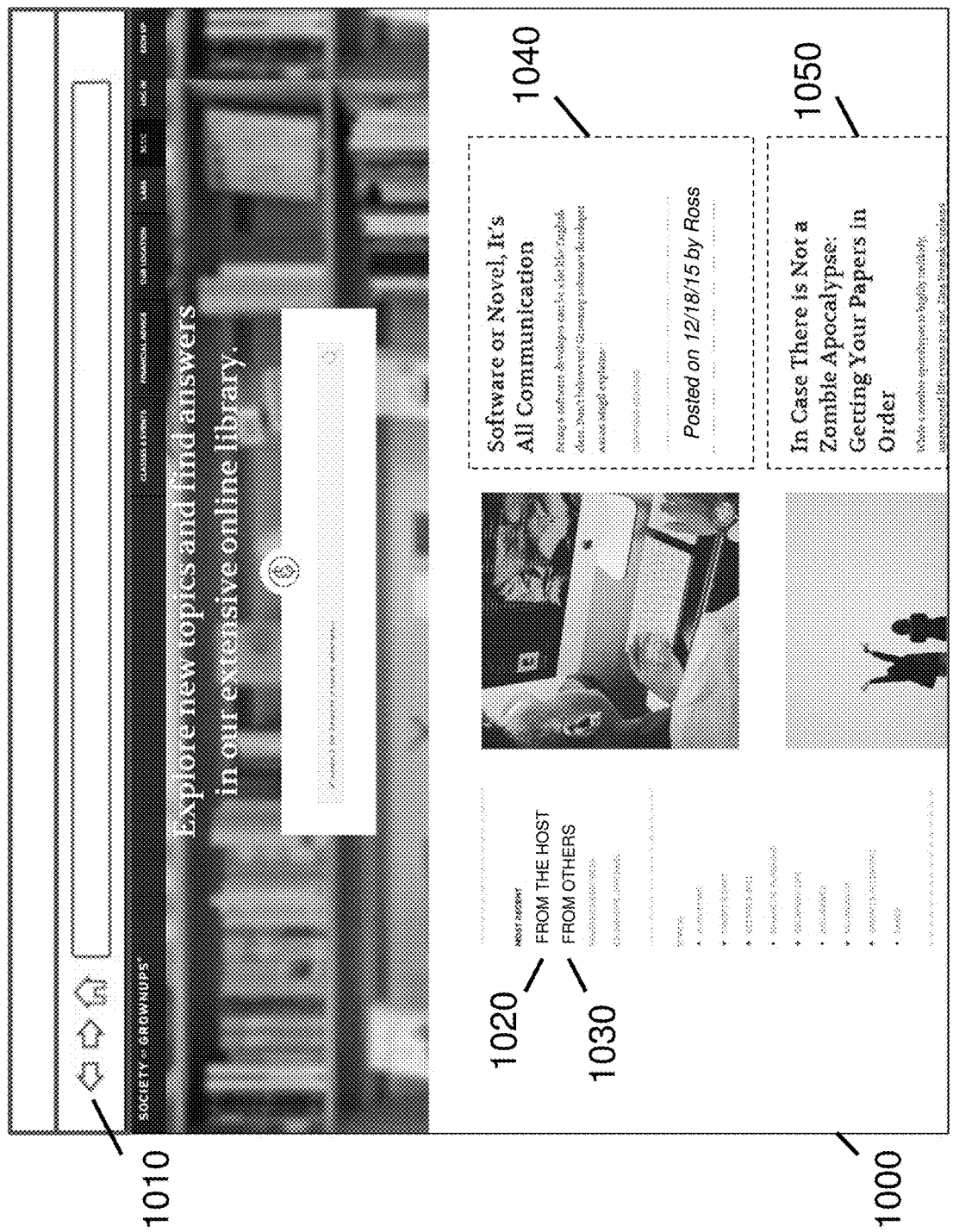
FIG. 10 is a graphical user interface, according to an exemplary embodiment.

Referring to FIG. 10, an exemplary user interface as a web page 1000 rendered on a web browser 1010 is shown. This web page 1000 can be generated by a server in the system architecture, which then transmits the web page 1000 for rendering on the web browser 1010 of the user computing devices upon receiving a request from the user computing device. The request may be a query for particular electronic media or for a user interface that presents relevant electronic media. The server can respond to the request by obtaining relevant electronic media or other electronic media responsive to the request by querying and obtaining the electronic media from one or more internal or external databases.

Figure 11:
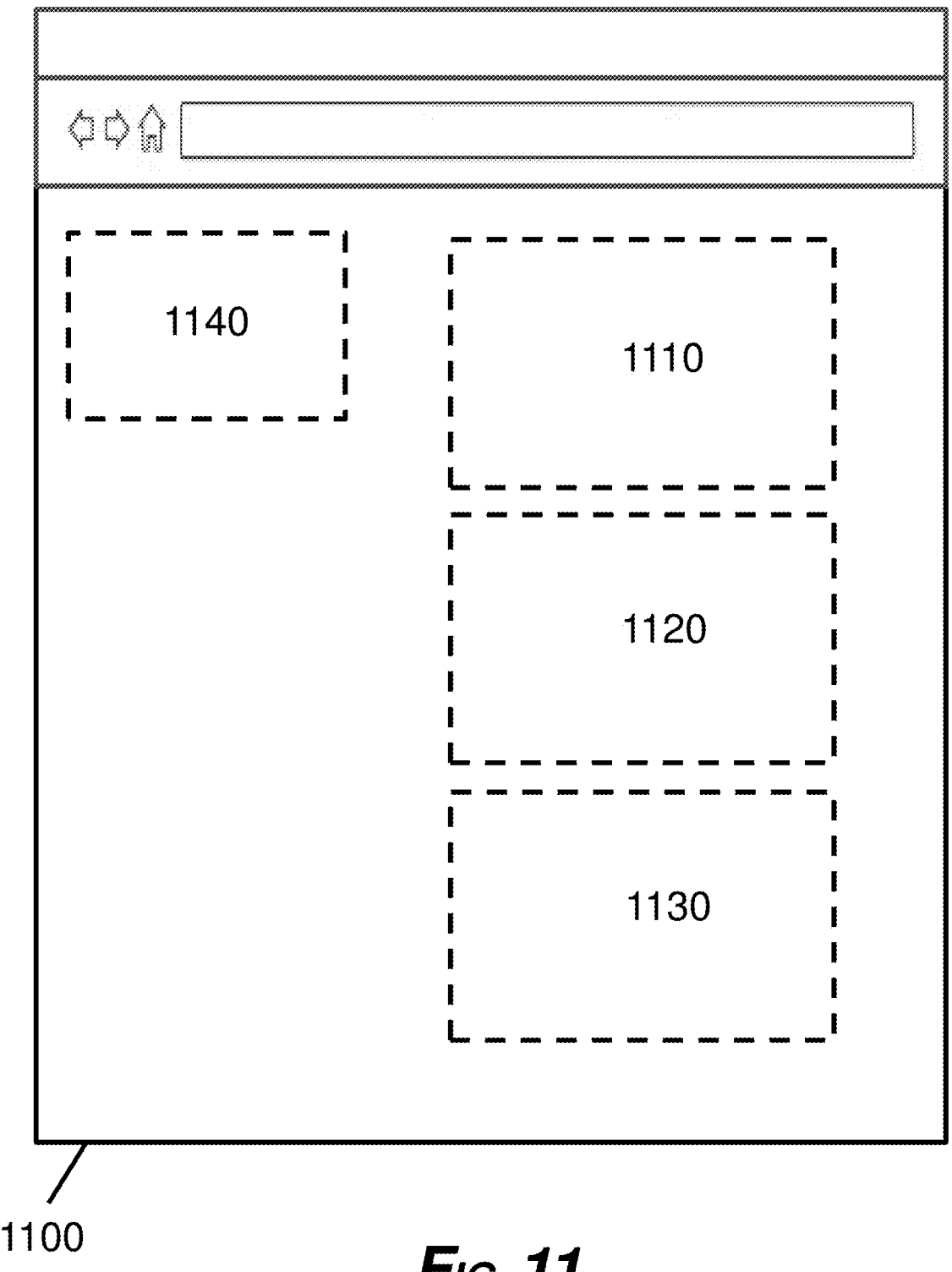
FIG. 11 is a graphical user interface with dynamic sub-interfaces, according to an exemplary embodiment.

As shown in FIG. 11, a web page 1100 has one or more dynamic sub-interfaces 1110, 1120, 1130, 1140 within the web page 1100 configured to be populated with information, data, or electronic media by the server when rendering the web page 1100. Each dynamic sub-interface can be configured as an HTML5 container or other structural element, which has a hierarchical structure that incorporates media or content and can interact with other applications using APIs. In this exemplary embodiment, dynamic sub-interfaces 1110, 1120, 1130 can be populated with information about electronic media records, such as a title, summary, author, date, or the like. Also in this exemplary embodiment, dynamic sub-interface 1140 can be populated with a set of hyperlinks that can provide instructions to generate and transmit a new web page with electronic media from another source or navigate to another location. Each web page generated by the server, transmitted to the user computing device, and rendered on the web browser of the user computing device can have a structural format that includes one or more dynamic sub-interfaces that can dynamically retrieve information from an internal or external database via an API.

Referring back to FIG. 10, the web page 1000 presents a listing of hyperlinks, which can be used to navigate through various sources of electronic media. In this example, web page 1000 includes a first hyperlink 1020 labeled "from the host" and a second hyperlink 1030 labeled "from others." The first hyperlink 1020 may be activated on the web browser by clicking, touching, or otherwise selecting, and the server will receive instructions to generate a second web page that includes electronic media stored in an internal or external database where the electronic media is associated with a host of the system architecture. For example, those electronic media records may have a tag or field that indicates that the electronic media was selected or generated by the host of the system architecture.

The second hyperlink 1030 may be activated on the web browser by clicking, touching, or otherwise selecting, and the server will receive instructions to generate a second web page that includes electronic media stored in an internal or external database where the electronic media is associated with another user of the system architecture. For example, those electronic media records may have a tag or field that indicates that the electronic media was selected, generated, or uploaded by another user of the system architecture.

The web page 1000 can display a listing of electronic media, which may be representing by one or more dynamic sub-interfaces 1040, 1050 that can include a title, summary, author, and date. This information can be retrieved by an electronic media record in the internal or external database that stores the electronic media. Upon selecting to view the electronic media on a web page, the server will retrieve the content of the electronic media in the record and generate a second web page with the content of the electronic media. The author information can include an indication as to whether the electronic media was shared, generated, or uploaded by a host of the system architecture or another user, such as by showing a user name, as indicated by the electronic media record.

A user may view electronic content and desire to upload it for others to view. The user computing device can transmit the electronic media containing the content to the server, which can store the electronic media in an electronic media record in an internal or external database. The server identifies which user requested the distribution of the electronic media. The electronic media record then associates the electronic media with the demographic information and risk score of that user. In one embodiment, the electronic media record may associate the electronic media with a range of risk scores that contains that user's risk score. In another embodiment, the electronic media record stores separate characteristics of the demographic information of the user.

Upon generating and storing the electronic media record, the server generates a dynamic distribution list containing users that have at least one characteristic of the demographic information and the risk score associated with the electronic media record. In a preferred embodiment, the dynamic distribution list is not a static distribution list based on a predetermined listing of user data records, as the distribution list is generated and maintained based upon profiles of users, which may be customized, modified, or otherwise change in a way that may make a user eligible for the distribution list or ineligible for the distribution list, and the user may be included or no longer included. The dynamic distribution list is generated upon the creation of the electronic media record and the listing of users contained in the dynamic distribution list are selected based upon the uploading user's demographic information and risk score at the time of uploading. For example, if the uploading user is 30 years old, single, male, and has a risk score of 80 on a scale of 100 (representing a high risk tolerance), then any electronic media uploaded from that user may be stored in a data record that is associated with users between 25-35 years old, single, or male and has a high risk tolerance (representing scores between 70 and 90 on a scale of 100).

The web page 1000 displays content for the user, including any relevant electronic media 1040, 1050. When presenting electronic media uploaded from other users, the server will render the web page 1000 to include only those electronic media records that include at least one characteristic of the demographic information of the uploading user as well as a similar risks score of the uploading user. The server dynamically generates the distribution list, and when rendering the web page 1000, determines whether to display information from an electronic media record based on whether the user for whom the web page 1000 is being rendered is associated with the dynamic distribution list (e.g., at least one demographic characteristic and similar risk score).

When a user accesses the web page 1000 to see electronic media uploaded from others (e.g., upon activation of the second hyperlink 1030), the dynamic distribution list is used by the server to determine whether the user is eligible to access each electronic media record. If the user was eligible when the distribution list was created upon the generation of the electronic media record, the user may no longer be eligible if the user has changed a demographic (e.g., has since become older than the age range of a particular electronic media record) or customized the risk score associated with the user (e.g., changed the risk score to 30 out of 100, which represents a low risk threshold). The dynamic distribution list will no longer identify the user as having a demographic and risk score such that this electronic media record should be shared with the user.

In conventional social media and peer-to-peer sharing systems, a user can upload media, and the user can determine who should receive the media. In some conventional systems, the media is distributed to everyone in the user's network. In other conventional systems, the user may select a list of users (e.g., friends, co-workers, group members, everyone) who should receive or have access to the media. These conventional systems do not dynamically generate a distribution list to determine which other users have similar characteristics and risk scores.

Internal database 102 may store any suitable information generated from the operation of one or more modules within personal financial management system 106 and may make it available for further analysis performed by one or more modules within personal financial management system 106 and/or the users of personal financial management system 106. Components that may be included in system architecture 100 may interact with each other through network connections 126. Network connections 126 may refer to any connection between computers including intranets, local area networks (LAN), virtual private networks (VPN), wireless area networks (WAN), and the internet, among others.

Figure 2:
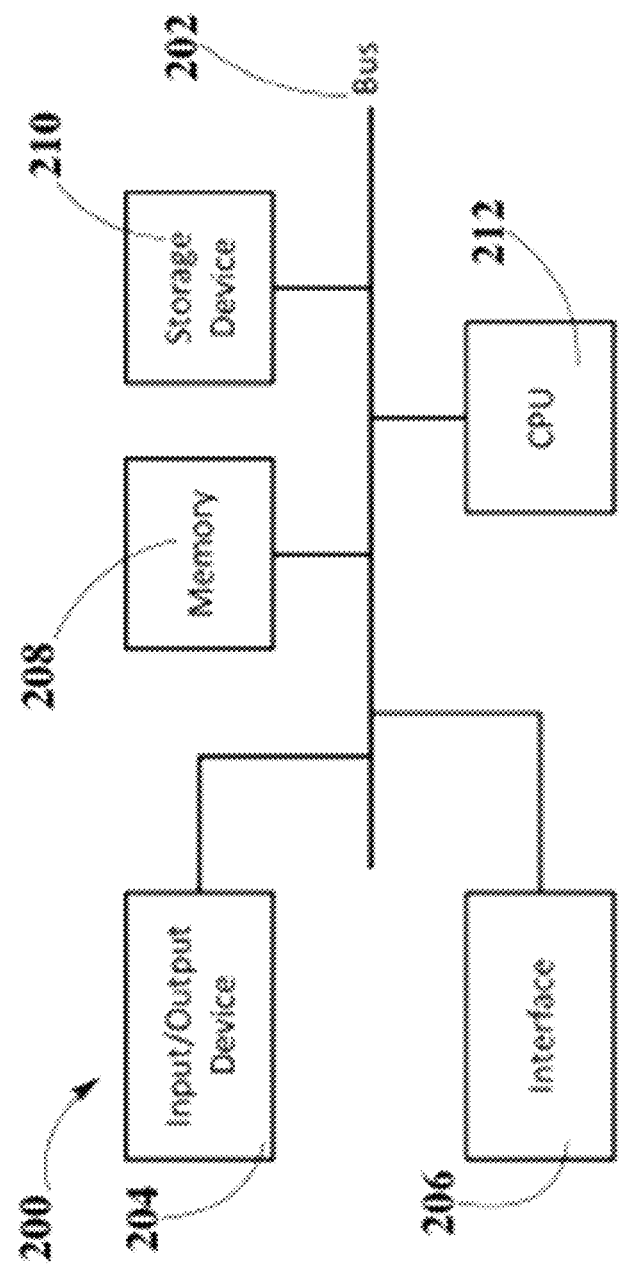
FIG. 2 is an exemplary computing device in which one or more embodiments of the present disclosure may operate, according to an embodiment.

FIG. 2 is an exemplary computing device 200 in which one or more embodiments of the present disclosure may operate, according to an embodiment. In one embodiment, computing device 200 includes bus 202, input/output (I/O) device 204, communication interface 206, memory 208, storage device 210 and central processing unit 212. In another embodiment, computing device 200 includes additional, fewer, different, or differently arranged components than those illustrated in FIG. 2.

In FIG. 2, bus 202 is in physical communication with (I/O) device 204, communication interface 206, memory 208, storage device 210, and central processing unit 212. Bus 202 includes a path that permits components within computing device 200 to communicate with each other. Examples of (I/O) device 204 include peripherals and/or other mechanism that may enable a user to input information to computing device 200, including a keyboard, computer mice, buttons, touch screens, voice recognition, and biometric mechanisms, and the like. (I/O) device 204 also includes a mechanism that outputs information to the user of computing device 200, such as, for example a display, a light emitting diode (LED), a printer, a speaker, and the like.

Examples of communication interface 206 includes mechanisms that enable computing device 200 to communicate with other computing devices and/or systems through network connections. Examples of network connections include any suitable connections between computers, such as, for example intranets, local area networks (LANs), virtual private networks (VPNs), wide area networks (WANs), the Internet, and the like. Examples of memory 208 include random access memory 208 (RAM), read-only memory (ROM), flash memory, and the like. Examples of storage device 210 include magnetic and/or optical recording medium, ferro-electric RAM (F-RAM) hard disks, solid-state drives, floppy disks, optical discs, and the like. In one embodiment, memory 208 and storage device 210 store information and instructions for execution by central processing unit 212. In another embodiment, central processing unit 212 includes a microprocessor, an application specific integrated circuit (ASIC), or a field programmable object array (FPOA), and the like. In this embodiment, central processing unit 212 interprets and executes instructions retrieved from memory 208 and storage device 210.

According to some aspects of this embodiment, computing device 200 is implemented as part of a server, computing devices 124, and the like. Examples of these implementations include servers, authorized computing devices, smartphones, desktop computers, laptop computers, tablet computers, a PDAs, another type of processor-controlled device that may receive, process, transmit digital data, and the like. Additionally, computing device 200 may perform certain operations that are required for the proper operation of system architecture 100. Suitable computing devices 200 may perform these operations in response to central processing unit 212 executing software instructions contained in a computer-readable medium, such as memory 208.

In one embodiment, the software instructions of system are read into memory 208 from another memory location, such as storage device 210, or from another computing device 200 (e.g., computing devices 124, and the like) via communication interface 206. In this embodiment, the software instructions contained within memory 208 cause central processing unit 212 to perform processes that will be described in FIGS. 3-6, below. Alternatively, hardwired circuitry may be used in place of or in combination with software instructions to implement processes described herein. Thus, implementations described herein are not limited to any specific combination of hardware circuitry and software.

Figure 3:
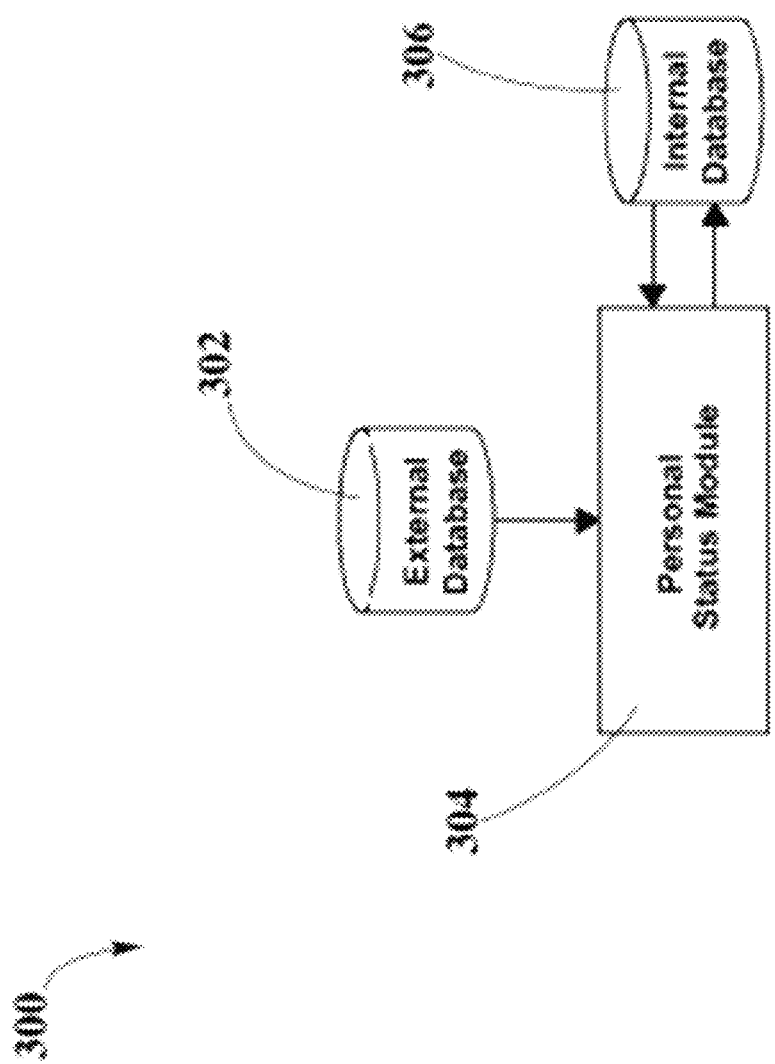
FIG. 3 is an exemplary block diagram of a portion of system architecture pertaining to a personal status module.

FIG. 3 is an exemplary block diagram 300 of a portion of personal financial management system 106. Block diagram 300 includes external database 302, personal status module 304, and internal database 306. It should be understood that personal financial management system 106 can include less components, more components, or different components depending on the desired analysis goals. In an example and referring to FIG. 1, said personal status module 304 is implemented as personal status module 112 in system architecture 100. In FIG. 3, personal status module 304 is operatively coupled to and in communication with internal database 302 and external database 306.

Personal status module 302 is implemented as one or more computer software modules that include programmatic rules or logic for executing/running different user interfaces for gathering user data, estimating a user's behavioral profile, estimating user's preferences, and calculating financial metrics related to the user, among others. User data includes current preferences, financial information, demographic information, and the like. In these embodiments, personal status module 304 is configured to present a various sets of questions to a user, and collects responses via a client computing device, and is one means for performing this function. Personal status module 304 stores data collected from the user in internal databases 306. In one embodiment, personal status module 304 estimates the user's behavioral profile by scoring answers provided by the user to a set of tests requested by personal status module 304 and comparing the resulting score with a plurality of behavioral models' reference scores that personal status module 304 retrieves from internal database 306. In another embodiment, personal status module 304 uses big data analytics to approximate the user's behavioral profile by comparing the user score with a plurality of scored used profiles retrieved by personal status module 304 from internal database 306. In yet another embodiment, personal status module 304 estimates user's risk taking, and investment preferences, among others by using big data analytics on user data retrieved by personal status module 304 from internal database 306.

Figure 4:
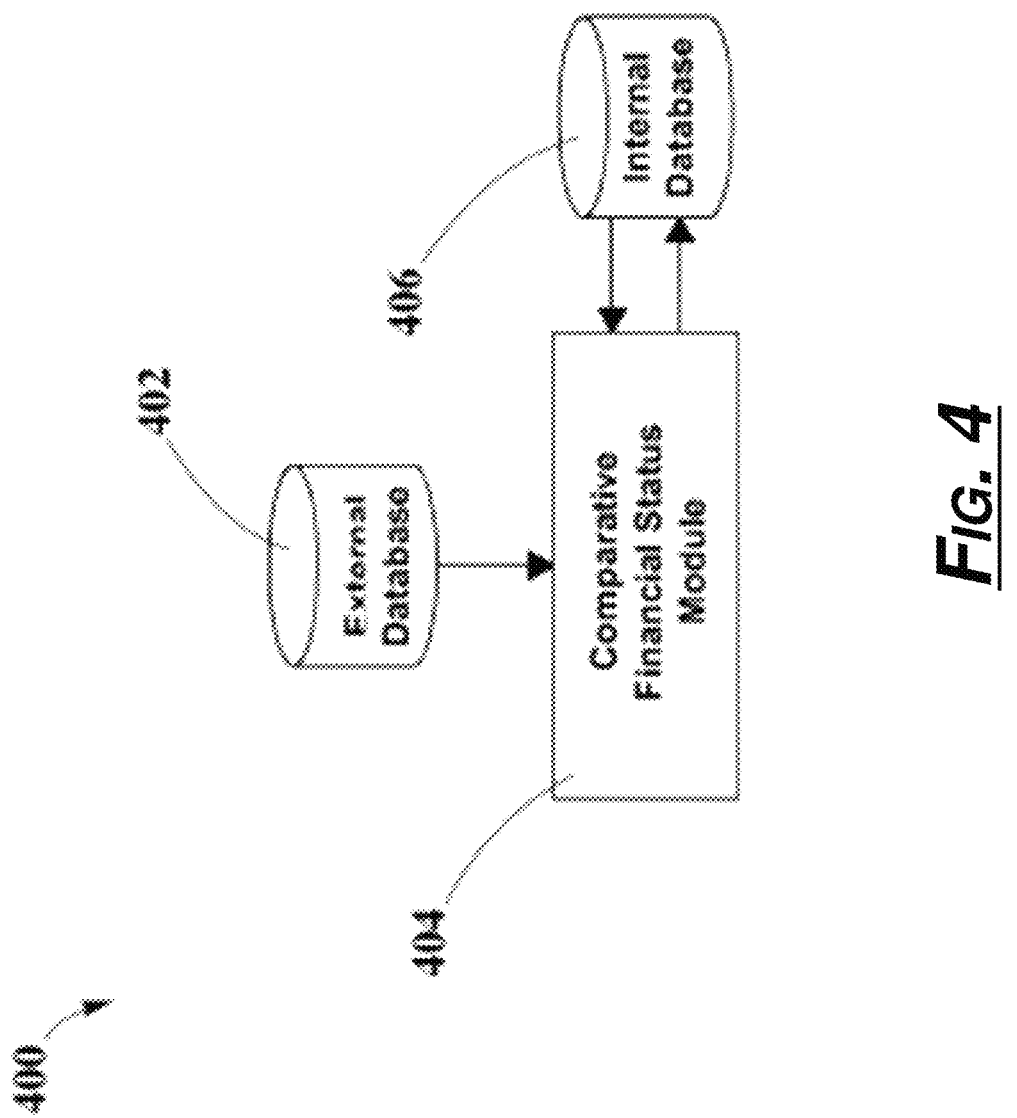
FIG. 4 is an exemplary block diagram of a portion of system architecture pertaining to a comparative financial status module.

FIG. 4 is an exemplary block diagram 400 of a portion of personal financial management system 106. Block diagram 400 includes external database 402, comparative financial status module 404, and internal database 406. It should be understood that personal financial management system 106 can include less components, more components, or different components depending on the desired analysis goals. In an example and referring to FIG. 1, said personal status module 404 is implemented as comparative financial status module 114 in system architecture 100. In FIG. 4, comparative financial status module 404 is operatively coupled to and in communication with internal database 402 and external database 406.

The comparative financial status module 404 is implemented as one or more computer software modules that include programmatic rules or logic for executing/running different user interfaces for gathering user data, and calculating comparative financial metrics related to the user and the user's behavioral profile. User data includes financial information, demographic information, user's preferences, and the like. User data gathered by comparative financial status module 404 is stored in internal database 306. In these embodiments, comparative financial status module 404 is configured to retrieve a user's behavioral profile from internal database 406; retrieve financial data from external database 402; retrieve financial information, demographic information, user's preferences, and the like from internal database 406; calculate comparative statistics on these data, and produce reports that are presented to the user via a client computing device. In one embodiment, comparative statistics presented to the user are calculated based on the user's behavioral profile.

Figure 5:
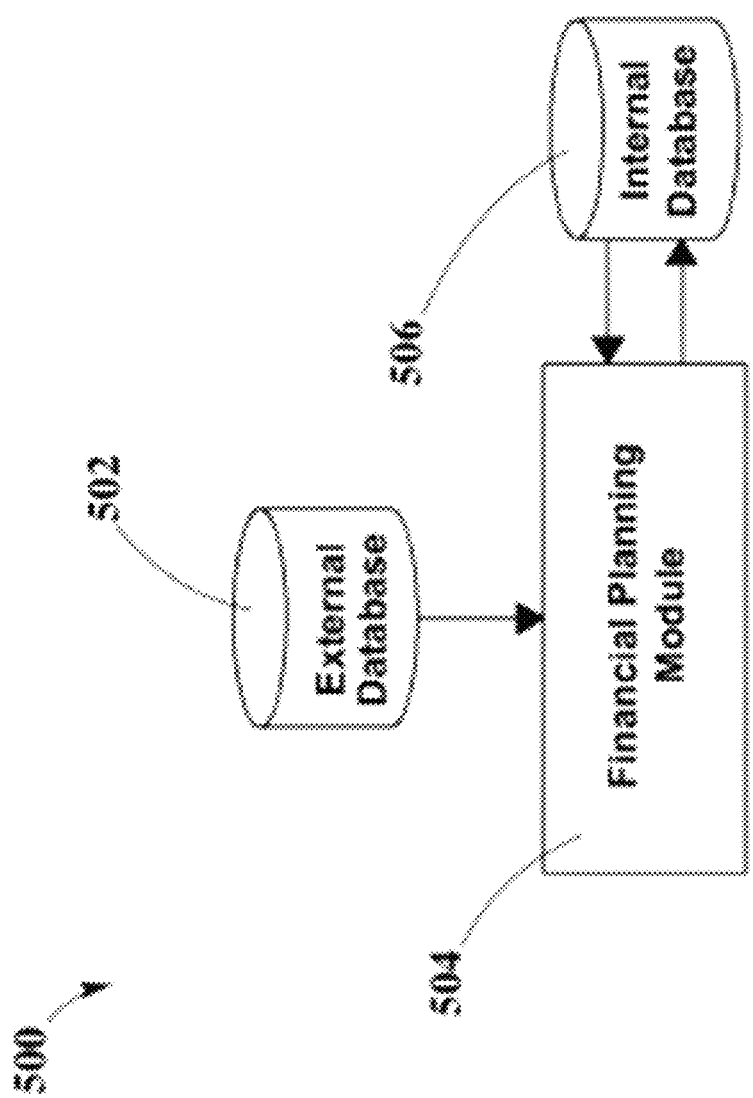
FIG. 5 is an exemplary block diagram of a portion of system architecture pertaining to a financial planning module.

FIG. 5 is an exemplary block diagram 500 of a portion of personal financial management system 106. Block diagram 500 includes external database 502, financial planning module 504, and internal database 506. It should be understood that personal financial management system 106 can include less components, more components, or different components depending on the desired analysis goals. In an example and referring to FIG. 1, said personal status module 504 is implemented as financial planning module 118 in system architecture 100. In FIG. 5, financial planning module 504 is operatively coupled to and in communication with internal database 502 and external database 506.

The financial planning module 504 is implemented as one or more computer software modules that include programmatic rules or logic for executing/running different user interfaces for gathering user data, and calculating a financial plan for the user. User data includes expenses (e.g., housing, shopping, health, and beauty, among others), savings, investments, and the like. User data gathered by financial planning module 504 is stored in internal databases 506. In these embodiments, financial planning module 504 is configured to retrieve data from internal database 506, and external database 502, estimate a user's financial plan from these data, and present it to the user for further customization via a client computing device. In one embodiment financial planning module 504 estimates a financial plan for the user based on the user's behavioral profile, by retrieving, from internal database 506, a default financial plan associated to the user's behavioral profile. In another embodiment, financial planning module 504 estimates a financial plan for the user by using big data analytics on a set of potential investment, insurance, and other financial options associated to a plurality of users and behavioral profiles.

A plurality of methods implemented by the personal financial mentoring and management system may be performed by one or more computing devices such as computing device 200. The methods are implemented with components of the exemplary operating environments of FIGS. 1-5. The steps of this exemplary method are embodied in a computer readable medium containing computer readable code such that the steps are implemented when the computer readable code is executed by a computing device. While the blocks in the disclosed process are shown in a particular order, the actual order may differ. In some embodiments, some steps may be performed in parallel.

Figure 6:
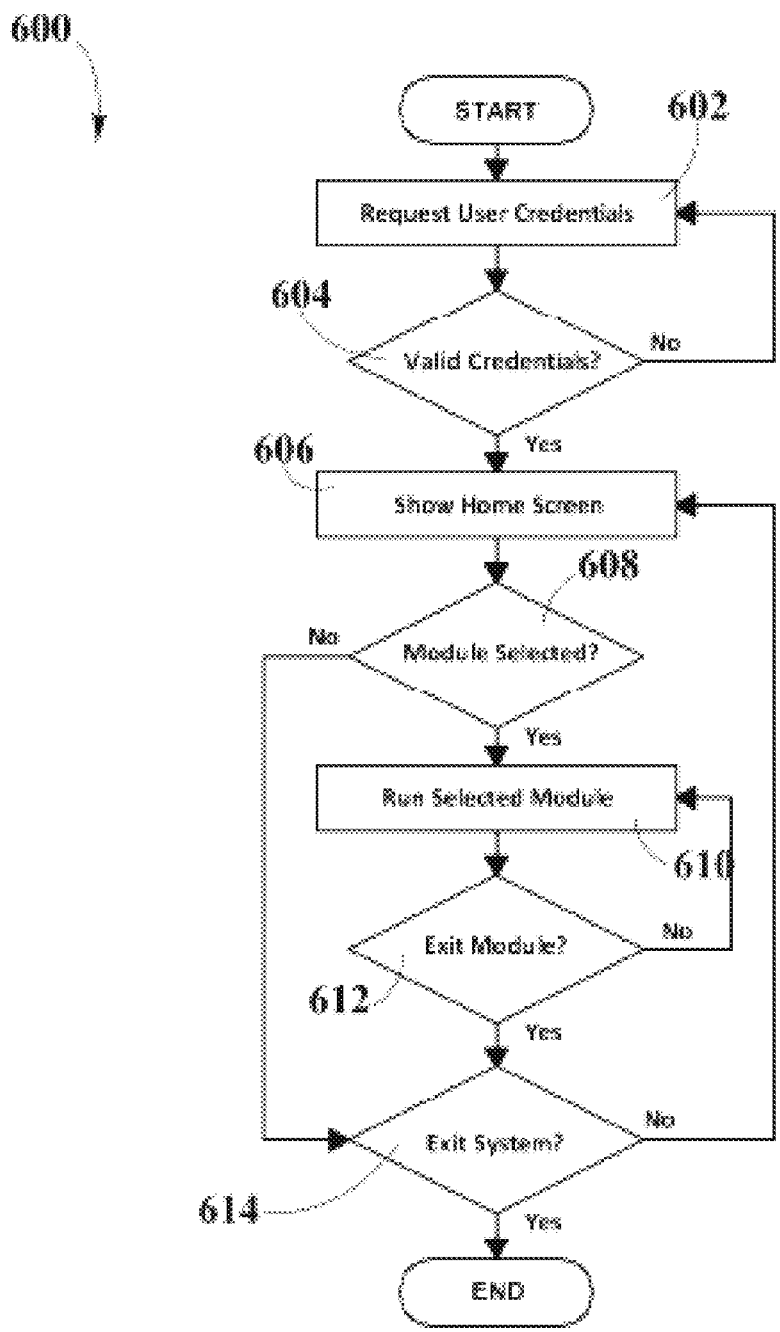
FIG. 6 is a flow diagram of a process that describes the general operation of a personal financial management system, according to another embodiment.

FIG. 6 is a flowchart of process 600 generally illustrating an exemplary method for personal financial management system according to another embodiment.

In FIG. 6, the process begins by a processor, such as central processing unit 212, displaying a user interface on at least one client computing device, to request authentication credentials from a user who may interact with a personal financial management system (step 602). The process may validate, at step 604, the credentials provided by the user. The process may continue to display the home screen on the user interface, at step 606, only after the user provides appropriate credentials, at step 604.

At step 606, the process may display a home screen and menu that list all options that may be available to the authenticated user through the various software modules that may be part of the personal financial management system. At step 608, the process may wait for an authenticated user to select an option to execute. If the authenticated user chooses one or more of those options, the processor may execute the appropriate module at step 610. In step 610, modules that personal management system can execute include one or more appointment modules, one or more timeline modules, one or more personal status modules, one or more comparative financial status modules, one or more learning modules, one or more financial planning modules, one or more content management system (CMS) modules, and any other suitable software module required for the proper operation of personal financial management system. Processes that may describe the operation of personal status module, comparative financial status module, and financial planning module will be described in FIGS. 7-9 below.

In step 612, the process may wait for additional interaction of the authenticated user with the user interface. In step 614, if the authenticated user chooses to exit the module, the processor may end the currently running module and may wait for additional interaction from the user. If the authenticated user chooses not to exit the personal financial management system, the process may wait for the authenticated user to select an option, continue at step 608. If the authenticated user chooses to exit the personal financial management system, at step 616, process 600 may end, and the processor may execute additional steps (not shown in FIG. 6) which includes saving current status of the personal financial management system, logging off the authenticated user, and handling over control of the computing device to another process.

According to some embodiments, the appointment module enables the user to manage appointments. In an example, an authenticated user can manage counseling appointments in which the user can choose type of advising visit, book appointments and pay later, confirm appointments, see list of upcoming appointments, and see list of previous appointments, among others.

In another embodiment, the timeline module enables the user to manage tasks and milestones. In an example the timeline module allows the user to create a timeline, view a timeline, zoom in/out on a timeline, add actions to perform, see detailed view of action items, mark action item as complete, and mark action item as in progress, among others.

In one embodiment, the personal status module estimates the user's behavioral profile by scoring answers provided by the user to a set of tests requested by a personal status module and comparing the resulting score with a plurality of behavioral models' reference scores that the personal status module retrieves from an internal database. In another embodiment, the personal status module uses big data analytics to approximate the user's behavioral profile by comparing the user score to a plurality of scored behavioral profiles retrieved by the personal status module from the internal database. In yet another embodiment, personal status module estimates a user's risk taking and investment preferences, among others, by using big data analytics on data associated with a plurality of users and a plurality of behavioral profiles. In this way, efficiencies are created by providing the financial institution with ways to improve dialog with users as compared to conventional methods employing established methodology. Additional, users get a more personal financial advice without the financial institution needing to add additional manpower.

In yet another embodiment, the comparative financial status module retrieves financial data from an external database; retrieves user's financial information, user's demographic information, user's preferences, and the like from internal database; calculates comparative statistics on these data, and produces reports that are presented to the user via a client computing device.

In another embodiment, the learning module provides the user with access to tips, news, book descriptions, among others. Additionally, the learning module includes a list of recommended classes that are relevant for the authenticated user, as well as links to blogs, and important announcements, among others. Information presented to the user is estimated relevant by using big data analytics from plurality of information objects that the learning module retrieves from an internal database. In this embodiment the learning module retrieves information objects that have an associated behavioral profile that is also the user's estimated behavioral profile. In yet another embodiment, the learning module estimates the user's preference for information objects by using big data analytics on a set of information objects associated to a plurality of users and a plurality of behavioral profiles.

In other embodiments, the learning module estimates classes that may be of interest for the user and displays a list of potentially relevant classes on a computer display. In this embodiment, the learning module allows the user to manage classes that user is currently be enrolled in, and classes the user was previously enrolled in, among others. Additionally, the learning module allows the user to enroll in a class, see recommended classes, see a list of upcoming classes, see the list of completed classes, see a detailed view of each class, add classes to a timeline, see the class attendance limit and spots available, see a list of recently completed classes, see the list of all completed classes, and see specific class details, among others. The user can interact with online classes and other information provided by the learning module through a content management system (CMS). Through the CMS the user can upload media files to the system to be shared across all users of the personal financial management system. Media may include photos, pictures, audio, and video, among others.

According to another embodiment, the financial planning module estimates a user's financial plan from data retrieved from internal and external databases, and presents it to the user for further customization via a client computing device. In one embodiment the financial planning module estimates a financial plan for the user based on the user's behavioral profile, by retrieving, from an internal database, a default financial plan associated to the user's behavioral profile. In another embodiment, the financial planning module estimates a financial plan for the user by using big data analytics on a set of potential investment, insurance, and other financial options associated with a plurality of users and a plurality of behavioral profiles.

For each module, as well as specific options, process 600 may display a unique user interface that may enable the user to interact with the personal financial management system.

Each software module may include a process for calculating and storing specific information related to the authenticated user. Some examples are disclosed below.

Figure 7:
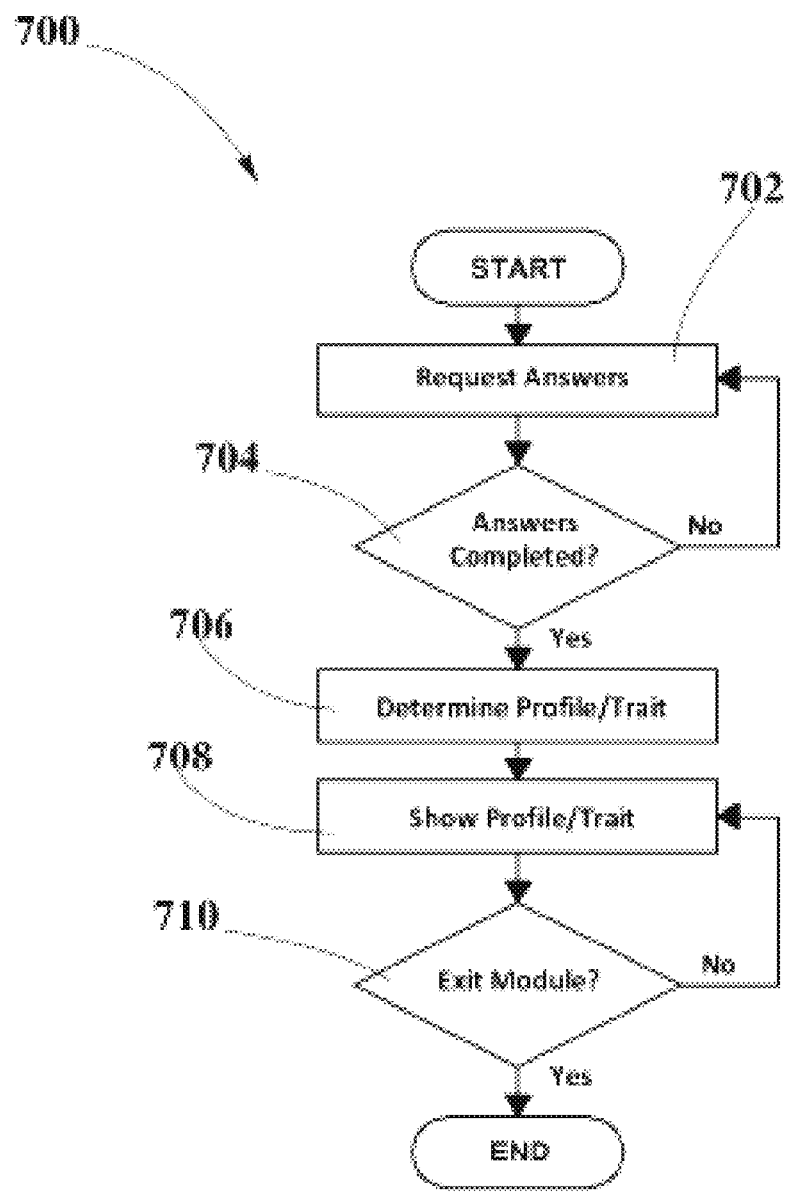
FIG. 7 is a flow diagram of a process for estimates a user's behavioral profile, according to another embodiment.

FIG. 7 is a flowchart of a process 700 generally illustrating an exemplary method for estimating a user's behavioral profile, estimating user's preferences, and calculating financial metrics related to the user, among others. A plurality of steps included in process 700 may be performed by one or more computing devices such as computing device 200 implementing/running one or more software modules/processes of the exemplary operating environments of FIGS. 1 and 3-5. The steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

In FIG. 7, the process begins by requesting, at step 702, information from the user by displaying a set of questions on a client computing device. Process continues, at step 704, by checking if all the questions have been answered by the user. In step 706, when all the questions have been answered by the user, process 700 continues to determine the user's behavioral profile. In this embodiment, the user's profile score is estimated by scoring the answers provided by the user. In this embodiment, the user's behavioral profile is approximated by comparing the user score to a plurality of scored user profiles that the personal status module retrieves from an internal database. In yet another embodiment, the user's behavioral profile, user's risk taking, and investment preferences, and financial metrics related to the user, among others are estimated by using big data analytics on data retrieved by the personal status module from internal database and external databases.

In step 708, the user's estimated behavioral profile, estimated preferences, and financial metrics are displayed on the user interface of a computing device. Information presented to the authenticated user at step 708 may include a short description of the calculated behavioral profile, prominent people that share the same calculated behavioral profile, and general statements given by prominent users that share the same profile, among others. In step 710 the process may wait for additional input from the authenticated user, if the user chooses to exit, process 700 may end.

Figure 8:
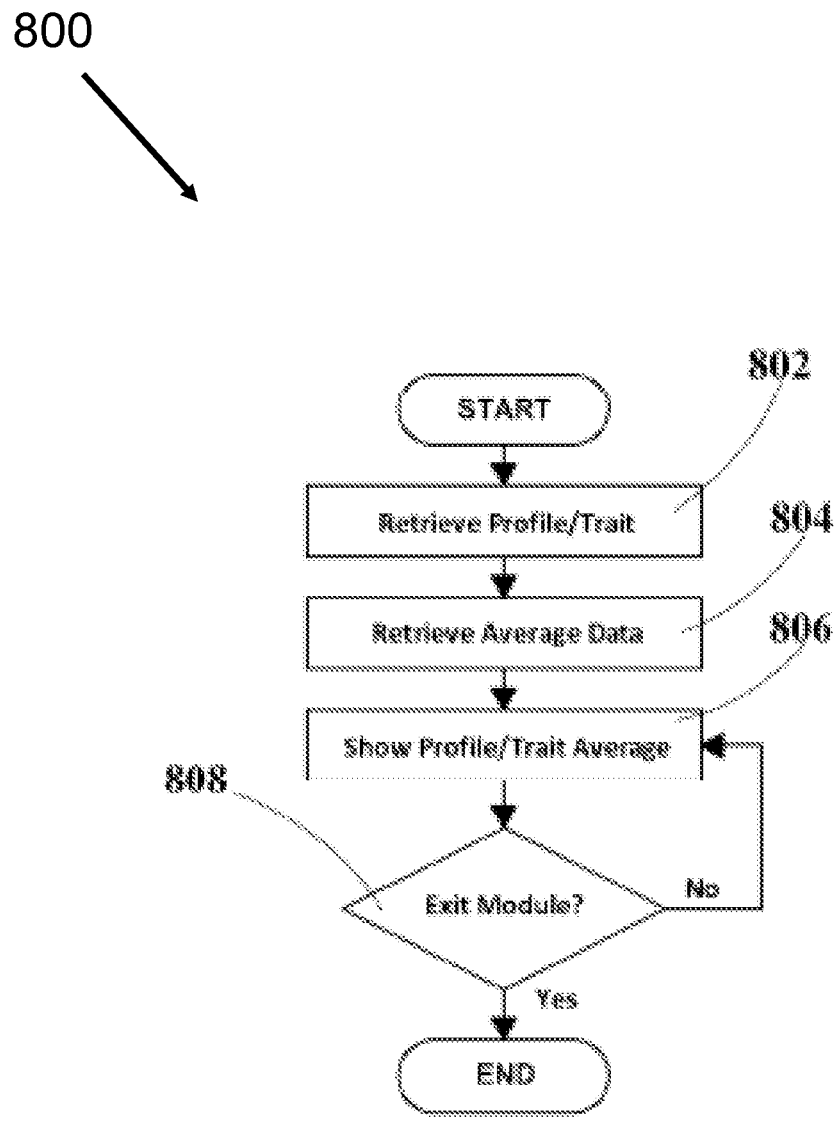
FIG. 8 is a flow diagram of a process for producing comparative financial statistics for a user based on the user's behavioral profile, according to another embodiment.

FIG. 8 is a flowchart of a process 800 generally illustrating a method for calculating comparative financial metrics related to the user and the user's behavioral profile, providing the user with a summarized description of his/her current status of his/her goals, financial status, the user's behavioral profile and producing a comparison with similar demographics and behavioral profile. A plurality of steps included in process 800 may be performed by one or more computing devices such as computing device 200 implementing/running one or more software modules/processes of the exemplary operating environments of FIGS. 1-5. The steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

In FIG. 8, process 800 begins by retrieving from an internal database, the user's behavioral profile. It continues, at step 802, by retrieving from internal and external databases, data associated with the user's behavioral profile. Data associated with the user's behavioral profile includes financial income, expenditures (e.g., housing, shopping, health, and beauty, among others), investments, dwelling habits, age, and marital status among others. Additionally, step 804, includes calculating comparative statistics between the user and the data associated to the user's behavioral profile.

The process may continue, at step 806, by displaying the calculated comparative statistics and relevant retrieved information on the user interface of a client computing device. The process may then wait, at step 808, for additional user interaction. If the authenticated user chooses to exit, at step 808, process 800 may end.

Figure 9:
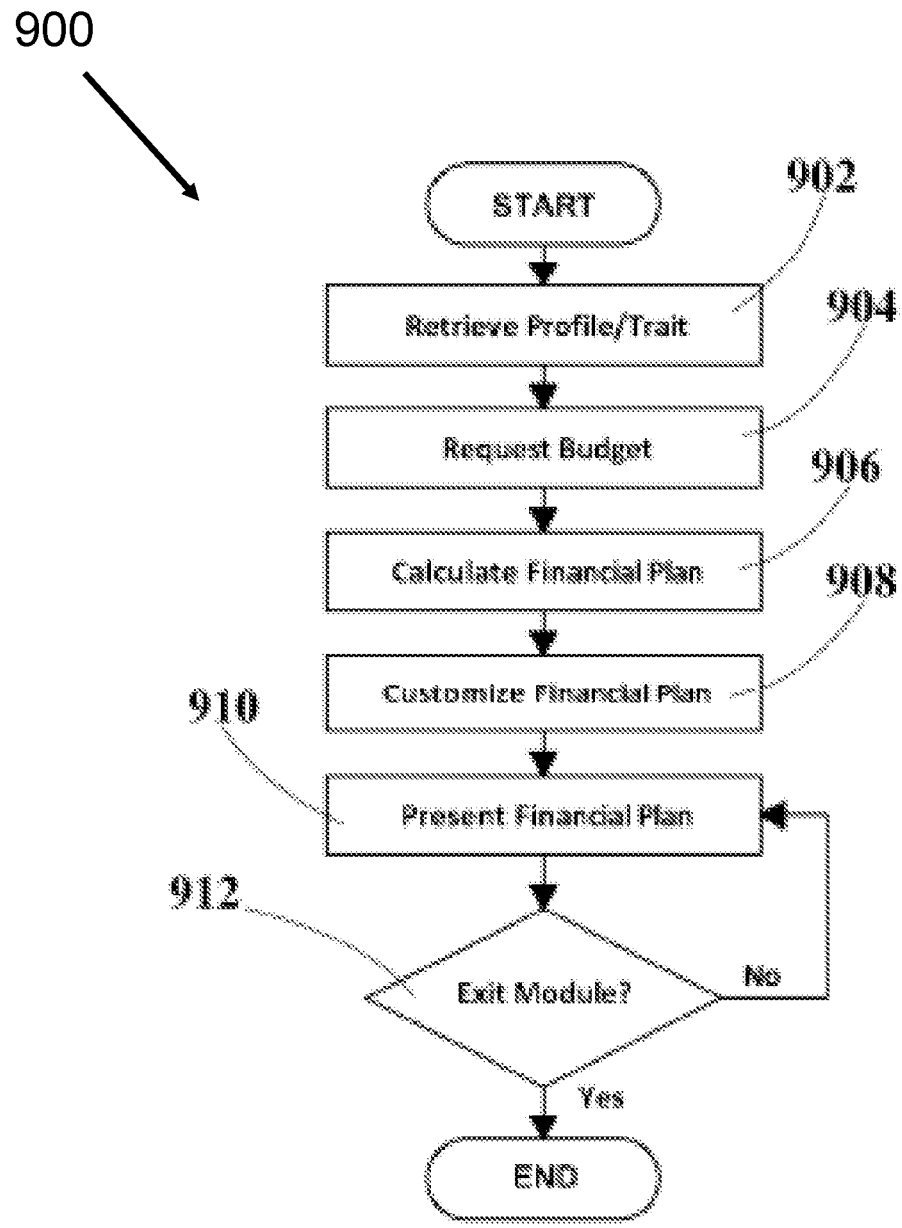
FIG. 9 is a flow diagram of a process for producing a financial plan for a user based on the user's behavioral profile, according to another embodiment.

FIG. 9 is a flowchart of a process 900 generally illustrating a method for gathering user data, and calculating a financial plan for the user and the user's behavioral profile. A plurality of steps included in process 900 may be performed by one or more computing devices such as computing device 200 implementing/running one or more software modules/processes of the exemplary operating environments of FIGS. 1-5. The steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

In FIG. 9, process 900 starts at step 902, by retrieving the user's behavioral profile from an internal database. Process 900 continues at step 904, by requesting the user's data from the user. User data includes expenses (e.g., housing, shopping, health, and beauty, among others), savings, investments, and the like. According to another embodiment, step 904 includes calculating the user's financial status. The user financial status includes calculating the user's net worth broken up into suitable categories including: cash, investment debt and assets, among others. The calculation of the user's net worth may require the user to answer a set of questions that may have been predefined in a financial planning module and stored in an internal database. In this embodiment, the process includes retrieving the list of questions from the internal database and presenting them to the user. In other embodiments, the process includes complementing the information required to calculate the user's net worth by retrieving, from external databases, financial information the user might not be able to provide. Financial information retrieved from external databases include average expenditure of people with a similar behavioral profile, average income and expenditures for the economic activity the user may perform, and top financial products typically owned by people sharing the same behavioral profile, among others. Additionally, the user interface allows the user to add items to be included in the net worth, view a graph of income/expenses/savings, display a graph of recommended savings and breakdown, request a report on transaction and trends for a given period of time, request a graph of expenditures of general items (e.g., housing, shopping, health, and beauty, among others), loading additional transaction trends, marking expense items as need versus want, and graphing wants versus needs on expenses, among others.

Figure 12:
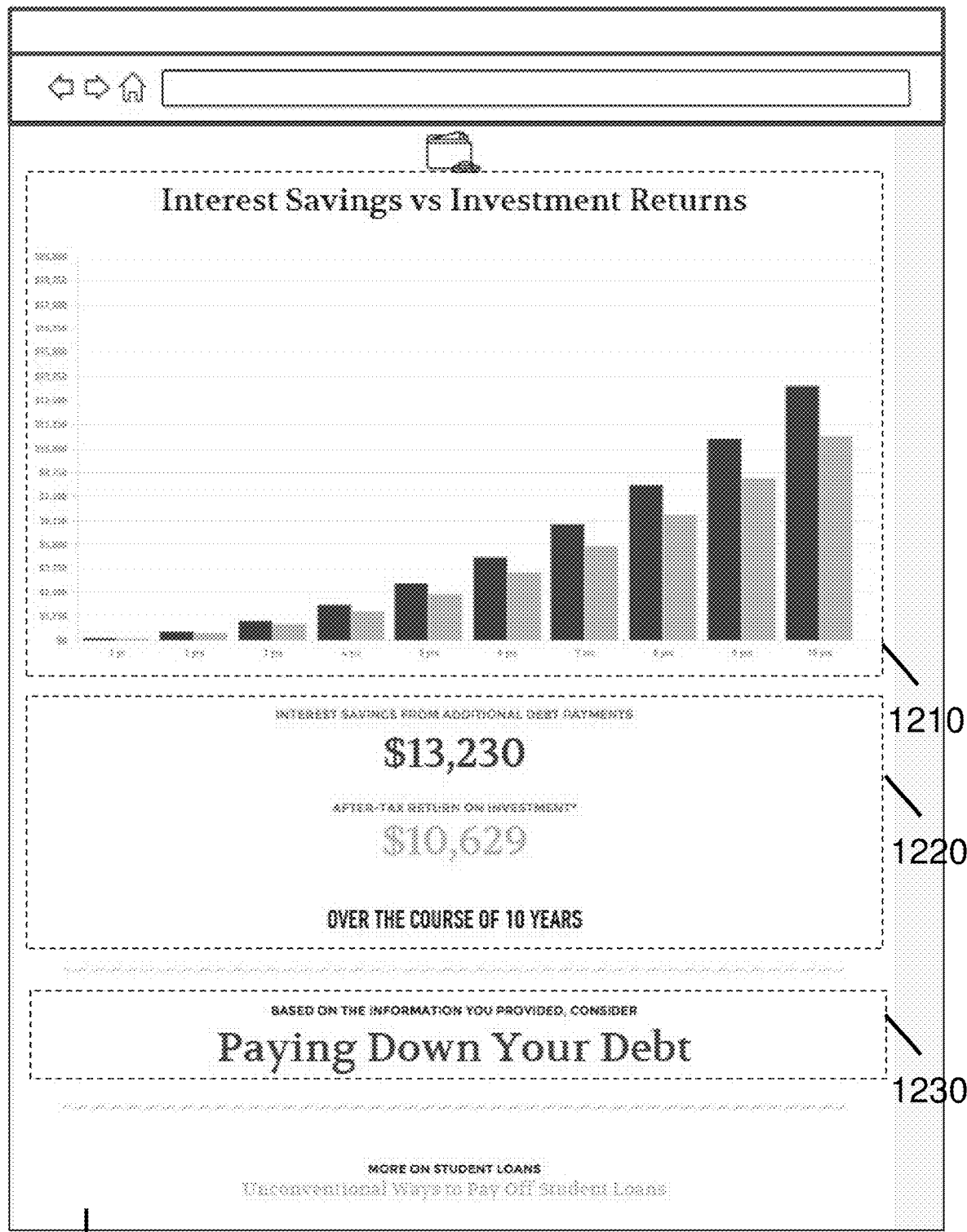
FIG. 12 is a graphical user interface, according to an exemplary embodiment.

Referring to FIG. 12, an exemplary web page 1200 is shown. This web page 1200 can be generated by a server in the system architecture, which then transmits the web page 1200 for rendering on a web browser of the user computing devices upon receiving a request from the user computing device. The request may be a query for a graphical representation of the user's profile, user's goals, or a comparison of the user's status to similar users. The server can respond to the request by generating a graphical representation of the requested data and rendering the web page 1200 to present to the requesting user on the web browser. The server may generate the web page 1200 by populating one or more dynamic sub-interfaces, as shown in FIG. 11 and described with respect thereto. Each web page generated by the server, transmitted to the user computing device, and rendered on the web browser of the user computing device can have a structural format that includes one or more dynamic sub-interfaces that can dynamically retrieve information from an internal or external database via an API. In this exemplary embodiment, the dynamic sub-interfaces can each contain a graphical representation or information responsive to the request.

Web page 1200 is shown with three dynamic sub-interfaces. A first dynamic sub-interface 1210 has a chart of interest savings versus investment returns. A second dynamic sub-interface 1220 presents information about "interest savings from additional debt payments" with a corresponding value of $13,230 and an "after tax return on investment" with a corresponding value of $10,629. A third dynamic sub-interface 1230 presents a link to electronic media associated with the request, which is shown in this example as "paying down your debt." The electronic media may be uploaded from another user, as described with respect to FIG. 10, or from the host of the system architecture.

Process 900 continues in step 906, by estimating a financial plan for the user based on the user's behavioral profile. In one embodiment, the user's financial plan has been pre-configured for the user's behavioral profile. In another embodiment, the financial plan is calculated at step 906 by using big data analytics on a set of potential investment, insurance, and other financial options associated to a plurality of users and behavioral profiles.

In step 908, the process continues by displaying the resulting financial plan on the user interface of a client computing device, and interacting with user for further customization. After customization is made, process 900 continues, at step 910, to present the customized financial plan through the user interface of the client computing device. Process then waits, at step 912, for additional user interaction. If the authenticated user chooses to exit, at step 912, process 900 may end, and the process may execute additional steps (not shown in FIG. 9) that may include saving current status, and handling over control of the computing device to another process.

In an additional embodiment, the process displays topic-specific action pages. The topic-specific action pages allow the user to take action on the financial plan. In this embodiment, the user can see a list of topics, create a check list of action items, view and add items to the check list, mark items as complete, add actions to the timeline, see related classes from the list of available classes related to the topic, see available advice related to the topic, and read content that related to the topic, among others. Topics available are selected from a previously defined list of potential topics that may be relevant for the user and the actions items in the financial plan. Potential relevance may be determined by the process by examining the authenticated user's behavioral profile, timeline, financial information, age, gender, marital status, health, and insurance products owned by the authenticated user, among others.

A user interested in knowing his/her net worth can use the personal financial management system described herein. The user logs in to the personal financial management system and selects the comparative financial status option. A processor runs a comparative financial status module and determines that there is no behavioral profile yet calculated for the user, so it runs a personal status module. The processor then requests a set of answers from the user. The processor then calculates a user's behavioral profile based on the answers provided by the user. The processor further continues running the comparative financial status module, calculates comparative financial metrics, and presents the user with a set of graphs that includes a comparison with similar demographics and behavioral profile.

Figure 13:
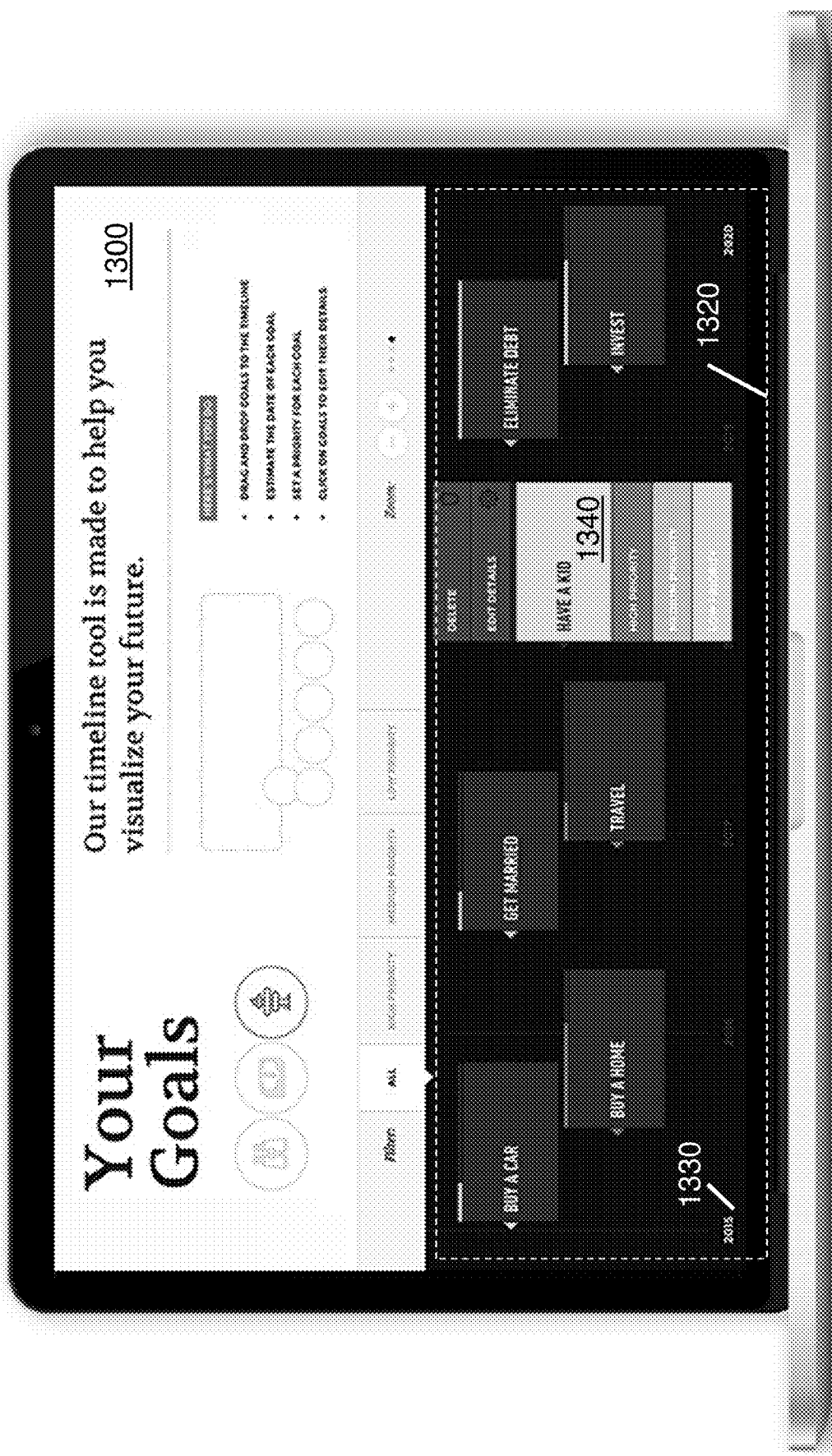
FIG. 13 is a graphical user interface on a user computing device, according to an exemplary embodiment.

Referring to FIG. 13, an exemplary user interface on a web page 1300 for customizing a financial plan is shown. The web page 1300 is configured to be displayed on a browser or application on a user computing device, such as laptop 1310. The server of the system architecture can generate the web page 1300 and transmit it for presentation on the browser or application.

The web page 1300 can be configured with a dynamic sub-interface, such as a canvas element 1320. The canvas element 1320 is a container for graphical representations executed by a script (e.g., JavaScript). The canvas element 1320 can allow for dynamic scriptable rendering of shapes and images. As each shape is positioned and/or resized, a correspondence algorithm adjusts based on the information presented by that graphical representation.

The web page 1300 has the canvas element 1320 comprising a portion or all of the display. In the exemplary embodiment, a horizontal axis of the canvas element 1320 represents a timeline 1330, whereby a beginning of the timeline 1330 is positioned at the left side and extends to an end of the timeline 1330 on the right side of the canvas element 1320. The timeline is shown as extending from 2015 to 2020, but any length of time can be used.

The web page 1300 allows a user to configure a financial plan. The web page presents options for goals (e.g., loans, events, plans, objectives, debts, income adjustments), each of which can be represented by a shape, such as a rectangle, in the canvas element 1320. The shape can be associated with data, which can be stored in a data record associated with the user. The data may include a label for the goal, a monetary amount, a length of a loan term, an interest rate of a loan, a priority rating, a length of the goal, or the like. This information can be accessed by clicking, activating, touching, or otherwise selecting the shape, whereby one or more input fields are displayed in a new window, a dynamic sub-interface, or another portion of the screen, such that the user can edit the information (e.g., change values, add a value, remove a value). Examples of goals that can be represented by shapes include "buy a car," "buy a home," "get married," "travel," "have a kid," "eliminate debt," and "invest." When the server receives a selection of the "have a kid" shape 1340, for example, the web page 1300 presents options to "delete," "edit details," or change the priority between "high priority," "medium priority," or "low priority." When the details of this shape are edited or a priority is selected, this information is stored in a data record associated with the user.

The shape can also be moved along the timeline 1330. The canvas element 1320 allows a user to select a shape and move it along the timeline 1330 in accordance with a desired time for the goal associated with the shape. The data record also stores the time or range of time on the timeline that is associated with the placement of this shape within the canvas element 1320. For example, the "have a kid" shape 1340 has been positioned on in the canvas element 1320 along the timeline 1330 at a time that represents the year 2018. The shape 1340 can be moved along the timeline 1330 to another year, and the record will dynamically update based upon the movement of the geometric representation on the canvas element 1320.

The server of the system architecture can prepare a financial plan or other guidance for the user. In the exemplary embodiment, the system architecture is configured to provide a financial plan to a user. The system architecture may initiate the process with a default plan based on the user's demographic information and risk score. The user interface of web page 1300 allows the user to further customize the financial plan. The goals presented as shapes in the canvas element 1320 have information that is inputted into a financial plan algorithm. The financial plan algorithm may receive inputs from one or more goals, and each goal may be represented more than one time (e.g., a user desires to buy two cars). As the canvas element 1320 allows these shapes representing the goals to be moved about the timeline 1330, the data record is dynamically updated, and the financial plan algorithm dynamically adjusts to account for new variables, new weightings, new timing, and new amounts.

Accordingly, the server can present a financial plan that is based upon a customized selection of goals on a user interface, whereby a set of shapes representing goals can be configured along a timeline and data representing those goals can be edited, which dynamically adjusts a financial plan algorithm to provide a solution in a more dynamic and on demand approach than conventional solutions.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
   generating, by a server, a first user profile based on data retrieved from one or more databases and one or more inputs received from an electronic device;
   determining, by the server, a risk tolerance score for the first user based on the first user profile;
   determining, by the server, a default plan comprising one or more goals for a first user operating the electronic device by identifying a second user whose risk tolerance score is within a threshold from the risk tolerance score of the first user, the second user having a second user profile that has at least one shared attribute with at least one user attribute within the first user profile;
   executing, by the server, a canvas script to display, on the electronic device, a graphical user interface containing a canvas element having one or more geometric representations of the one or more default plan goals, the graphical user interface having at least one sub-interface, wherein each geometric representation corresponds to a data record corresponding to each default plan goal; and
   in response to receiving an indication that the first user has interacted with the graphical user interface and repositioned the one or more geometric representations on the canvas element of the graphical user interface, wherein each repositioned geometric representation is associated with a ranked priority level input by the first user, the ranked priority level being selected from a list of options including a high priority, a medium priority, and a low priority,
   dynamically adjusting, by the server, the data record of each repositioned goal based upon each geometric representation's new position on the canvas element of the graphical user interface;
   dynamically adjusting, by the server, an algorithm based upon the information in the dynamically adjusted data record; and
   dynamically populating, by the server, at least one sub-interface of the graphical user interface to display an output of the algorithm upon the dynamic adjustment of the algorithm, wherein the output corresponds to the ranked priority level.

2. The method according to claim 1, wherein each geometric representation is a rectangle.

3. The method according to claim 1, further comprising receiving, by the server, a selection of one of the one or more geometric representations; and presenting, by the server, options to edit the information associated with the one of the one or more geometric representations.

4. The method according to claim 1, wherein each geometric representation is associated with a goal of a financial plan.

5. The method according to claim 3, wherein upon receiving a request to edit the information, dynamically adjusting, by the server, the algorithm.

6. The method according to claim 1, wherein the canvas element comprises a timeline, whereby repositioning a geometric representation dynamically adjusts timeline information in the data record.

7. A system comprising:
   a server coupled to a database, wherein the server is configured to:
   generate a first user profile based on data retrieved from one or more databases and one or more inputs received from a user computing device;
   determine a risk tolerance score for the first user based on the first user profile;
   determine a default plan comprising one or more goals for a first user operating the user computing device by identifying a second user whose risk tolerance score is within a threshold from the risk tolerance score of the first user, the second user having a second user profile that has at least one shared attribute with at least one user attribute within the first user profile;
   transmit a graphical user interface for presentation on a display of the user computing device, the graphical user interface containing a canvas element having one or more geometric representations of the one or more default plan goals, the graphical user interface having at least one sub-interface, wherein each geometric representation corresponds to a data record corresponding to each of the one or more default plan goals; and
   upon receiving a selection to move the one or more geometric representations and an input of a ranked priority level respectively associated with the one or more geometric representations, wherein the ranked priority level is selected from a list of options including a high priority, a medium priority, and a low priority,
   reposition the one or more geometric representations on the canvas element of the graphical user interface,
   dynamically adjust the data record based upon each repositioned geometric representation's new position on the canvas element of the graphical user interface,
   dynamically adjust an algorithm based upon the information in the dynamically adjusted data record, and
   dynamically populate at least one sub-interface of the graphical user interface to display an output of the algorithm upon the dynamic adjustment of the algorithm on the display of the user computing device, wherein the output corresponds to the ranked priority level.

8. The system according to claim 7, wherein each geometric representation is a rectangle.

9. The system according to claim 7, wherein the server is further configured to receive a selection of one of the one or more geometric representations; and present options to edit the information associated with the one of the one or more geometric representations.

10. The system according to claim 7, wherein each geometric representation is associated with a goal of a financial plan.

11. The system according to claim 9, wherein upon receiving a request to edit the information, wherein the server is further configured to dynamically adjust the algorithm.

12. The system according to claim 7, wherein the canvas element comprises a timeline, whereby repositioning a geometric representation dynamically adjusts timeline information in the data record.

* * * * *